(12) United States Patent
Chen et al.

(10) Patent No.: US 8,938,059 B2
(45) Date of Patent: Jan. 20, 2015

(54) SYSTEM AND METHOD FOR DISPLAYING CALL FLOWS AND CALL STATISTICS

(75) Inventors: Fei Chen, Green Brook, NJ (US); Lorraine Denby, Berkeley Heights, NJ (US); Wen-Hua Ju, Monmouth Junction, NJ (US); James M. Landwehr, Summit, NJ (US); Holger Vatter, Buettelborn (DE)

(73) Assignee: Avaya Inc., Basking Ridge, NJ (US)

( * ) Notice: Subject to any disclaimer, the term of this patent is extended or adjusted under 35 U.S.C. 154(b) by 1335 days.

(21) Appl. No.: 12/211,368

(22) Filed: Sep. 16, 2008

(65) Prior Publication Data
US 2009/0245493 A1  Oct. 1, 2009

Related U.S. Application Data (60) Provisional application No. 61/072,183, filed on Mar. 28, 2008.

(51) Int. Cl.
*H04M 3/58* (2006.01)
*H04M 3/36* (2006.01)
*H04M 3/51* (2006.01)
*H04M 15/00* (2006.01)

(52) U.S. Cl.
CPC *H04M 3/36* (2013.01); *H04M 3/51* (2013.01); *H04M 15/58* (2013.01); *H04M 2215/0188* (2013.01)

USPC ............. 379/212.01; 379/88.23; 379/211.01; 379/265.09; 455/415

(58) Field of Classification Search
USPC ................. 379/88.19, 88.23, 88.25, 112.08, 379/209.01, 917, 235, 265.02, 142.01, 379/265.09, 211.01, 211.02, 212.01, 379/213.01, 214.01; 455/417
See application file for complete search history.

(56) References Cited

U.S. PATENT DOCUMENTS

| | | | |
|---|---|---|---|
| 6,173,266 B1 | 1/2001 | Marx et al. | |
| 7,103,158 B2 | 9/2006 | Plan | |
| 8,041,019 B2 * | 10/2011 | Pieraccini et al. | 379/209.01 |
| 2004/0240650 A1 * | 12/2004 | Bear et al. | 379/142.01 |
| 2007/0133777 A1 | 6/2007 | Agapi et al. | |
| 2008/0037762 A1 * | 2/2008 | Shaffer et al. | 379/265.09 |

* cited by examiner

*Primary Examiner* — Md S Elahee (57) ABSTRACT

The system and method identify a plurality of call flow events in a call analysis system. Call statistics are associated with the call flow events. The call flow events are organized into event groups each containing a plurality of call flow events. Once an event group is selected, call statistics for the events of the event group are displayed. In addition, the system and method allow for selection of individual call flow events in order to display calls associated with the events.

28 Claims, 8 Drawing Sheets

SYSTEM AND METHOD FOR DISPLAYING CALL FLOWS AND CALL STATISTICS

RELATED U.S. APPLICATION DATA

This application claims the benefit under 35 U.S.C. §119 (e) of U.S. Provisional Application No. 61/072,183, filed Mar. 28, 2008, entitled "Contact Center Providing Integrated Analytics."

TECHNICAL FIELD

The system and method relates to contact centers, and in particular to systems and methods for displaying call flows and call statistics.

BACKGROUND

Current contact flow analysis systems are capable of displaying a call flow for a call center. In addition, these systems can display statistics for events (e.g. hitting 0 to go to the operator) in the call flow process. For example, U.S. Pat. No. 7,103,158 describes a system for displaying the events of the call flow in an Interactive Voice Response System (IVR). Statistics are generated for events in the call flow as a call flows through the IVR. These statistics are then associated with the events in the call flow.

Likewise, U.S. Patent Application No. 2007/0133777 creates a display of a call flow. Statistical information is then associated with events in the call flow. Statistics are tracked for specific call flows through the call center. A user then can select an event and display information about that particular event in a call flow. The user can also select a specific call flow through the call center and display information about that call flow.

The problem with these and other systems is that they lack the ability to fully utilize the information generated in the call flow process. As statistics are generated, the statistics from various events are not evaluated in relation to other events. This results in less effective management of call center resources.

SUMMARY

The system and method are directed to solving these and other problems and disadvantages of the prior art. The system and method identify a plurality of call flow events in a call analysis system. Call statistics are associated with the call flow events. The call flow events are organized into event groups, each of which contains a plurality of call flow events. Once an event group is selected, call statistics for the event group are displayed. In addition, the system and method allow for selection of call flows associated with events in order to display calls associated with the events.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
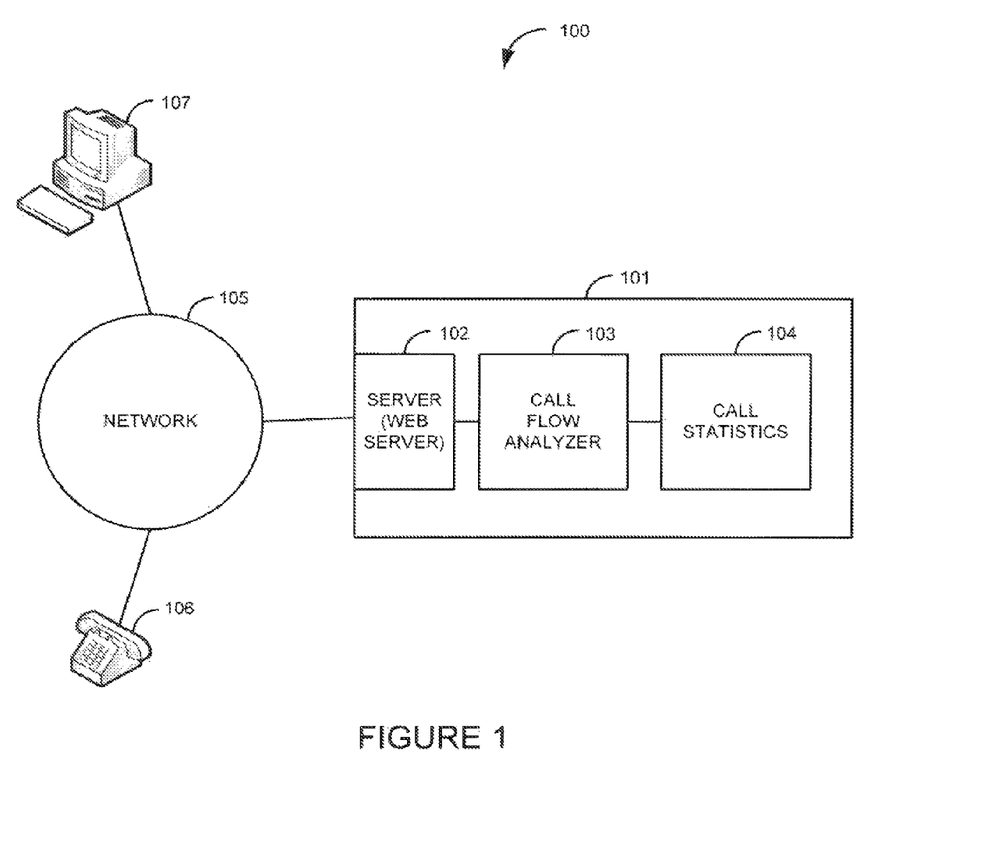
FIG. 1 is a block diagram illustrating a system for displaying call flows and call statistics.

FIG. 1 is a block diagram illustrating a system 100 for displaying call flows and call statistics 104. The system 100 comprises a call analysis system 101, which further comprises a server 102, a call flow analyzer 103, and a repository of call statistics 104. The call analysis system 101 is connected to a network 105. A computer 107 and a telephone 106 are connected to the network 105.

The call analysis system 101 may be any system capable of routing calls, such as a PBX, a server, a SIP proxy server, a router, a gateway, and the like. The server 102 may be a network server, a web server, an application server, and the like. The call flow analyzer 103 may be any system capable of analyzing call flows in a call analysis system, such as server, a computer, a PBX, and the like. The call statistics 104 may be any statistics associated with a call, such as a telephone number, a call duration, a date, call flow events associated with a call, a session Identifier (ID), an indication of whether or not the call was abandoned, and the like. The call statistics 104 may be generated from any type of call such as a voice call, a video call, a text message call, a multimedia call, an email call, a chat call, and the like. The network 105 may be any type of network capable of sending and receiving data such as an Internet Protocol (IP) network, a Time Division Multiplexed (TDM) network, and the like. Telephone 106 may be any type of telephone such as an analog telephone, a digital telephone, a cellular telephone, and the like. The computer 107 may be any device that can display information, such as a Personal Computer (PC), a Personal Digital Assistant (PDA), a telephone, and the like.

As telephone calls are received in the call analysis system 101 from telephone 106 and/or other devices (not shown), call statistics 104 are generated and associated with call flow events and the call flows associated with call flow events. As the calls progress through the call analysis system 101, additional call statistics 104 are generated and associated with the call flow events and the call flows associated with call flow events. For example, if a call is received at an Integrated Voice Response system (IVR), and the caller hits "0" to access the operator, there are several call flow events associated with this call flow. The first call flow event occurs when the IVR asks the caller for input. When the caller hits "0", the caller may be placed in a hold queue or the caller may go directly to the operator. Being placed in the hold queue is a call flow event. Likewise, having the call routed to the operator is a call flow event. As the call progresses, call statistics 104 (e.g. the time of each event) are generated and associated with the call flow events. This association can be done in either real-time or periodically.

Figure 2:
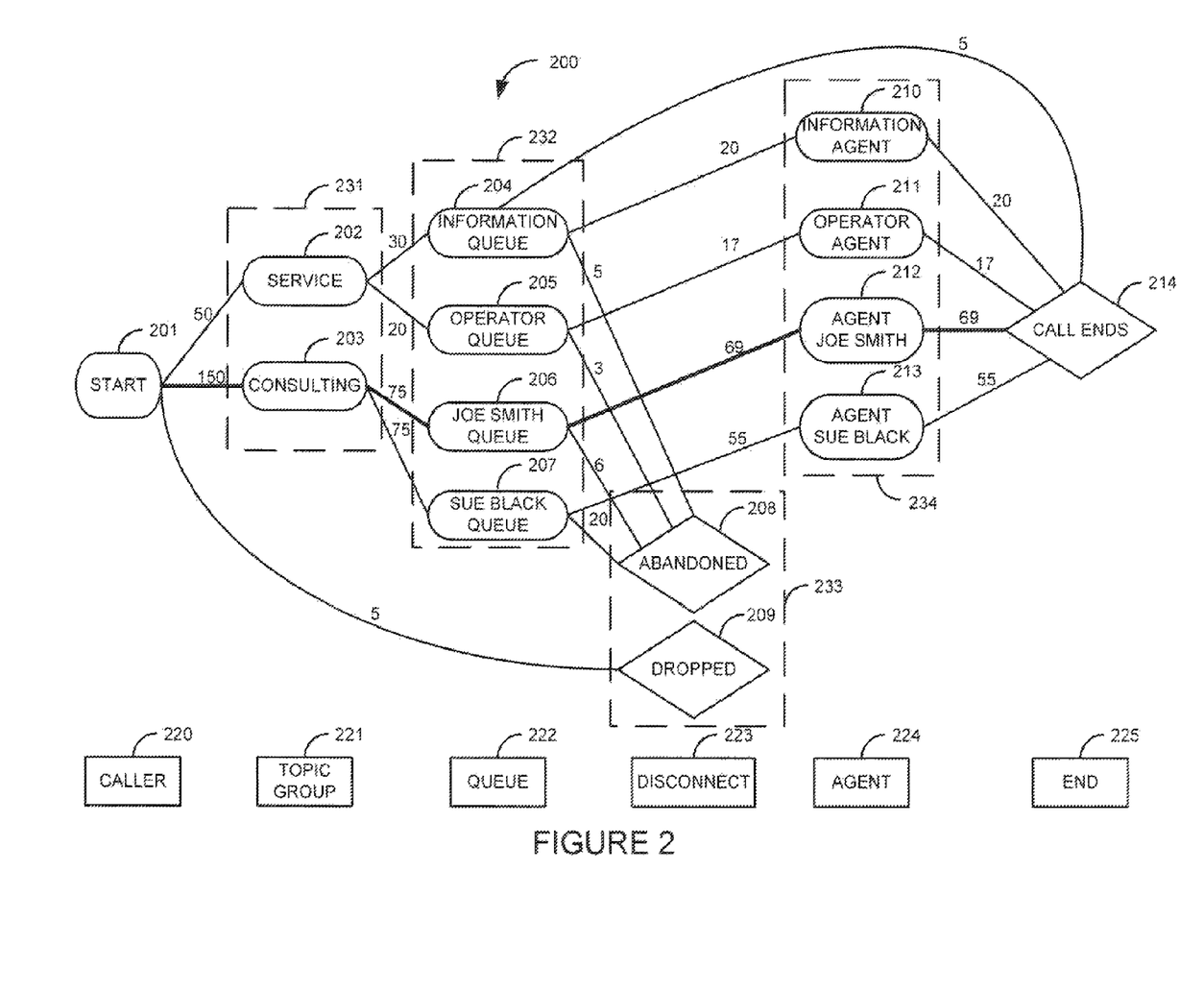
FIG. 2 is a graphical display of a call flow diagram illustrating call flows for a call analysis system.

The call flow analyzer 103 organizes a plurality of call flow events into one or more event groups 231-234. Each event group contains a plurality of call flow events. Typically, event groups 231-234 contain call flow events with similar characteristics such as being placed in a queue transferring to a different support group, transferring to an agent group, transferring to a second tier support group, and the like. However, event groups 231-234 may contain any type of call flow events.

An administrator using computer 107 selects an event group. The server 102 receives the selection of one of the event groups 231-234 and renders a display of the call statistics 104 associated with the plurality of call flow events that are included in the selected event group. The rendered display data is sent to computer 107. Computer 107 then displays the call statistics 104 associated with the call flow events in the selected event group. For example, an administrator will open a web browser on computer 107 and login into web server 102. A call flow diagram 200 like the one shown in FIG. 2 is displayed on computer 107.

FIG. 2 is a graphical display of a call flow diagram 200 illustrating call flows for a call analysis system 101. FIG. 2 comprises a plurality of call flow events 201-214. The numbers between call flow events (e.g., the 50 associated with start 201 and service 202) typically represent the number of calls that have made the transition between those pairs of call flow events. However, the same call could traverse the same route more than once. Call flow diagram 200 is an illustrative example of one implementation of a call flow. Many other call flows in a call analysis system 101 could be represented. For example, call transfers to a second level support group and/or a consulting group of agents could be incorporated into a call flow.

The call flow with the darker line that begins at start 201 and flows from consulting 203, to Joe Smith queue 206, to Joe Smith agent 212, and call ends 214 is the most frequently traveled call flow. This is the call flow that is most frequently called in the call flow diagram 200. Other end-to end paths could also be denoted.

In this example, the call flow starts 201 when a call is received in a call analysis system 101. The call flow can proceed to service 202, consulting 203, or dropped 209. If the call is dropped 209, the call is completed and the call flow ends. The call flows from service 202 to either the information queue 204 or the operator queue 205. The call flows from consulting 203 to either the Joe Smith queue 206 or the Sue Black queue 207. The call flow from the information queue 204 can proceed to call ends 214, information agent 210, or abandoned 208. The call flows from the operator queue 205 to either operator agent 211 or abandoned 208. The call flows from the Joe Smith queue 206 to either agent Joe Smith 212 or abandoned 208. The call flows from the Sue Black queue 207 to either agent Sue Black 213 or abandoned 208. The call flows from information agent 210 to call ends 214. The call flows from operator agent 211 to call ends 214. The call flows from agent Joe Smith 212 to call ends 214. The call flows from agent Sue Black 213 to call ends 214.

FIG. 2 contains buttons 220-225 for call flow events and event groups. Buttons 221-224 represent event groups 231-234. Buttons 220, 225 represent call flow events 201, 214 because there is only one event associated with each one of buttons 220, 225. Topic group button 221 represents event group 231 that contains call flow events 202 and 203. Queue button 222 represents event group 232 that contains call flow events 204-207. Disconnect button 223 represents event group 233 that contains call flow events 208 and 209. Agent button 224 represents event group 234 that contains call flow events 210-213.

As an example call flow, a call starts 201 and is directed by an IVR based on a caller selecting consulting 203. Based on availability, the call is placed in the Joe Smith queue 206. The caller is on hold in the Joe Smith queue 206 until agent Joe Smith 212 becomes available. At this point, the call is routed to agent Joe Smith 212. Agent Joe Smith 212 handles the call. When agent Joe Smith 212 completes the call, the call ends 214.

The call statistics 104 for each call flow event 201, 203, 206, 212, and 214 are updated as the call progresses through those events. For example, the number of calls associated with start 201 and consulting 203 is updated to 151. Likewise, the number of calls associated with consulting 203, and the Joe Smith queue 206 is updated to 76. The call statistics 104 for the Joe Smith queue 206 call flow event are updated to indicate how long the caller waited to be serviced by agent Joe Smith 212.

The number of calls associated with the Joe Smith queue 206 and agent Joe Smith 212 is updated to 70. Call statistics 104 for agent Joe Smith 212 are updated to indicate that agent Joe Smith 212 took 14 minutes to handle the call. The number of calls associated with agent Joe Smith 212 and call ends 214 is updated to 70.

Figure 3:
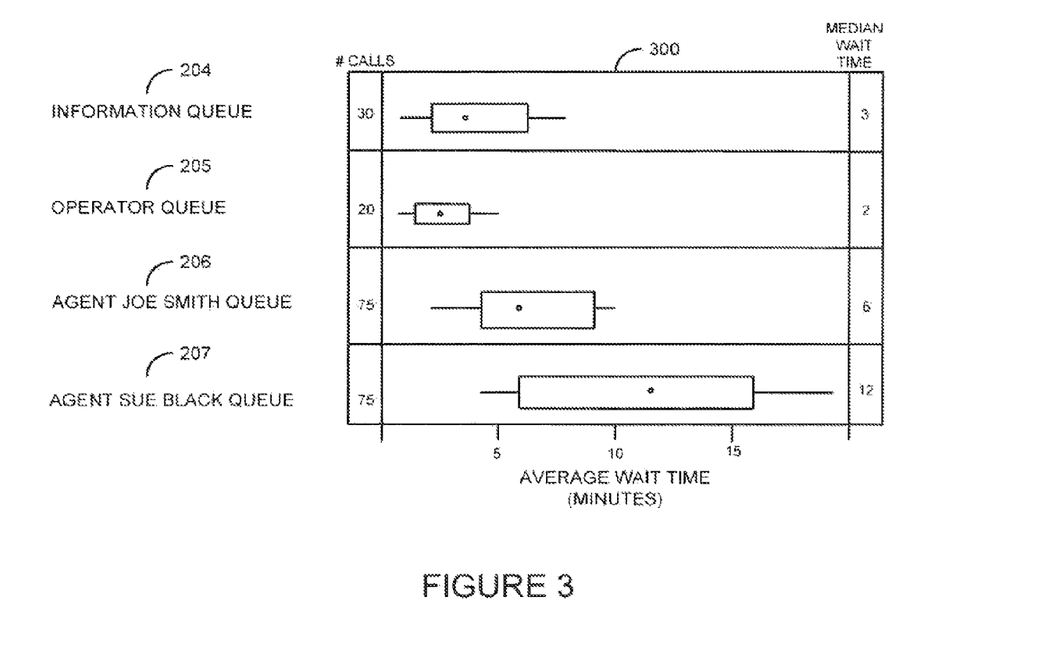
FIG. 3 is graphical display of call statistics for an event group.

The administrator selects one of the event groups (e.g., queue group 232). Responsive to the selection, the web browser identifies the selected event group to web server 102. Web server 102 receives the identifier of the selected event group. Web server 102 renders for display the call statistics 104 associated with the plurality of call flow events included in the selected event group. In this example, the web server 102 could create a message using HTML, Java applets, Java Server Pages, and the like. The message containing the rendered display is then sent to computer 107. Computer 107 displays the call statistics 104 associated with the call flow events in the event group in the computer's web browser. For example, the graphical display 300 of FIG. 3 is shown if queue group 232 were selected. In a second example, instead of a web browser and web server being used, an application on the computer 107 or the application server 102 could be substituted to perform the same function.

FIG. 3 is graphical display 300 of call statistics 104 for an event group. When an administrator selects one of the buttons 221-224 that represents an event group 231-234, the one or more call statistics 104 associated with the plurality of call flow events in the selected event group are displayed. As an illustrative example, the graphical display 300 in this example is generated when the administrator selects queue button 222 from FIG. 2. As a result of this selection, the graphical display 300 for the corresponding queue group 232 (call flow events 204-207) is displayed to the administrator. Call statistics 104 for the information queue 204, the operator queue 205, the Joe Smith queue 206, and the Sue Black queue 207 are displayed horizontally in the graphical display 300. This allows the administrator to compare the call wait times for each of the call flow events 204, 205, 206, 207 of the selected event group (queue group 232). The types of call statistics 104 that can be displayed may vary based on implementation, the event group, and the like. For example, the displayed call statistics 104 may include: how many calls were resolved the first time the caller calls (first call resolution) for a call group (e.g. an outsource group), a first call resolution for an agent, a call completion rate for a group, a call completion rate for an agent, abandoned calls for a group, disconnected calls for a group, a comparison of statistics of agent groups, and a comparison of agents. The statistics are often used to compare time spent on each call.

In this example, the administrator can see that the median wait time for the information queue 204 is 3 minutes. The median wait time for the operator queue 205 is 2 minutes. The median wait time for the Joe Smith queue 206 is 6 minutes. The median wait time for the Sue Black queue 207 is 12 minutes. The statistical information in the graphical display 300 assists the administrator in better allocating resources within the call analysis system 101. For example, the administrator may want to move resources to assist agent Sue Black 213 because the wait time for the Sue Black queue 207 is six times longer than the operator queue 205. Both agent Joe Smith 212 and agent Sue Black 213 have received 75 calls. The graphical display 300 also shows that the wait time for the Sue Black queue 207 is twice as long as the Joe Smith queue 206. This may indicate that that additional staff may be required to handle the calls that come into the Sue Black queue 207.

Figure 4:
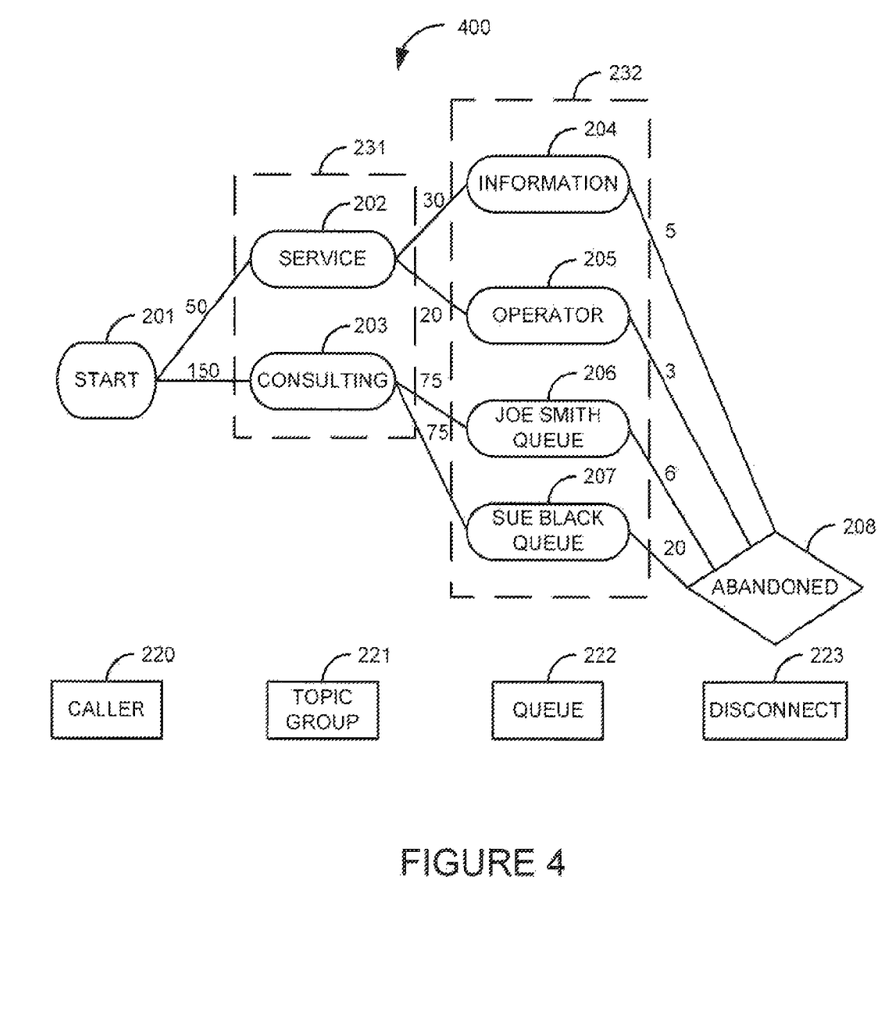
FIG. 4 is a graphical display of a call flow diagram illustrating call flows for a specific call flow event in a call analysis system.

FIG. 4 is a graphical display of a call flow diagram illustrating call flows for a specific call flow event in a call analysis system 101. The administrator selects the abandoned 208 call flow event in FIG. 2 to display the call flow for abandoned calls 400. The call flow diagram for abandoned calls 400 shows all call flows that end up at the abandoned 208 call flow event. In addition, the call flow diagram for abandoned calls 400 shows how many calls were abandoned 208 and from which call flow events 204-207 the calls were abandoned 208.

For example, the call flow diagram for abandoned calls 400 shows that there were twenty calls that were abandoned 208 from the Sue Black queue 207 out of seventy five total calls (27% abandonment rate). On the other hand, there were only six abandoned calls from the Joe Smith queue 206 out of seventy five calls (8% abandonment rate).

Figure 5:
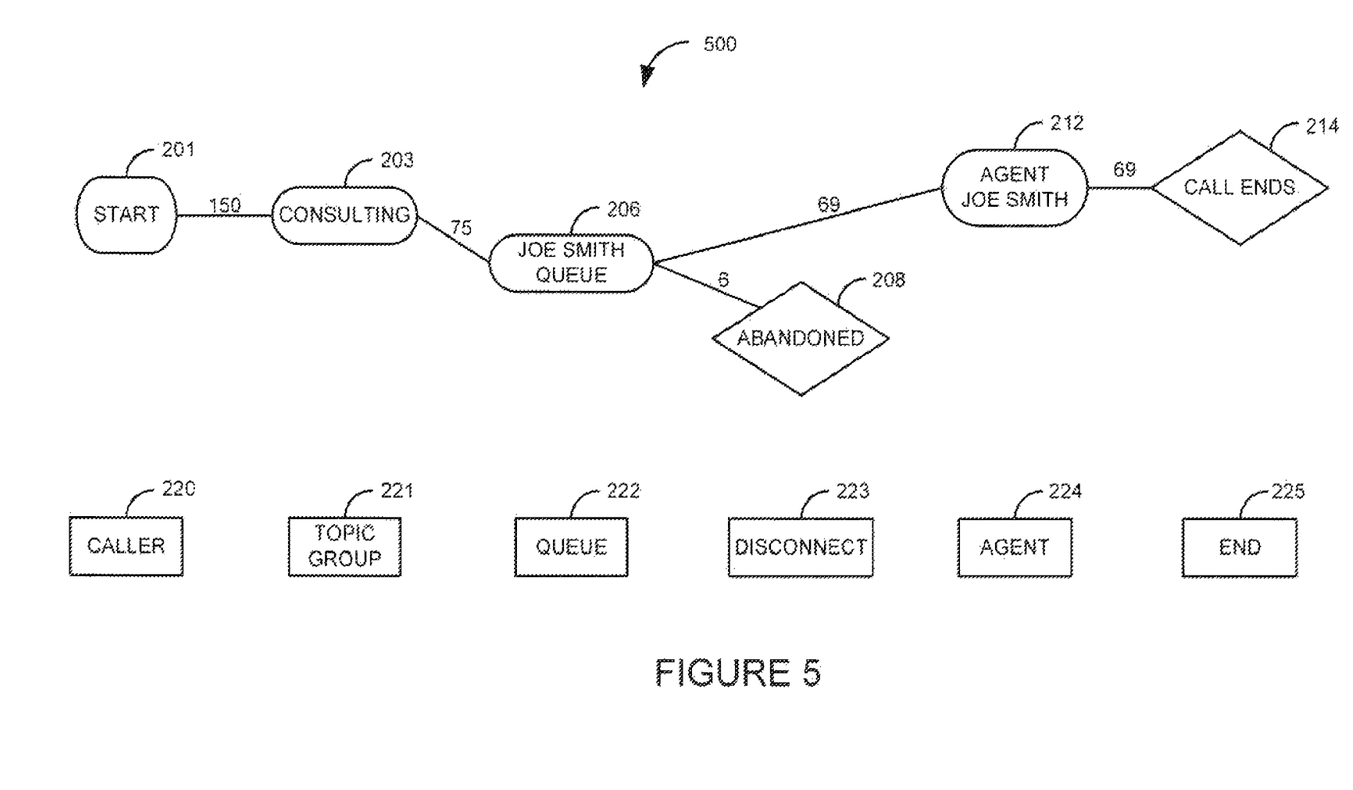
FIG. 5 is a graphical display of a call flow diagram illustrating call flows for an individual call flow event in a call analysis system.

FIG. 5 is a graphical display of a call flow diagram illustrating call flows for an individual call flow event in a call analysis system. Like in FIG. 4, an administrator can select a call flow event such as the call flow event for abandoned calls 400. In this example, the administrator selects the Joe Smith queue 206 call flow event in FIG. 4. Likewise, the Joe Smith queue call flow 500 is displayed. The Joe Smith queue call flow 500 is displayed if the administrator clicked on the Joe Smith queue event 206 in FIG. 2. The Joe Smith queue call flow 500 allows the administrator to view all call flows associated with the Joe Smith queue 206. This gives the administrator a rich set of administrative tools to view and administer resources for the call analysis system 101.

The administrator could select other events such as the information agent 210. The information agent 210 could represent a group of agents. Selecting the information agent 210 would display all the agents in the information agent 210.

Figure 6:
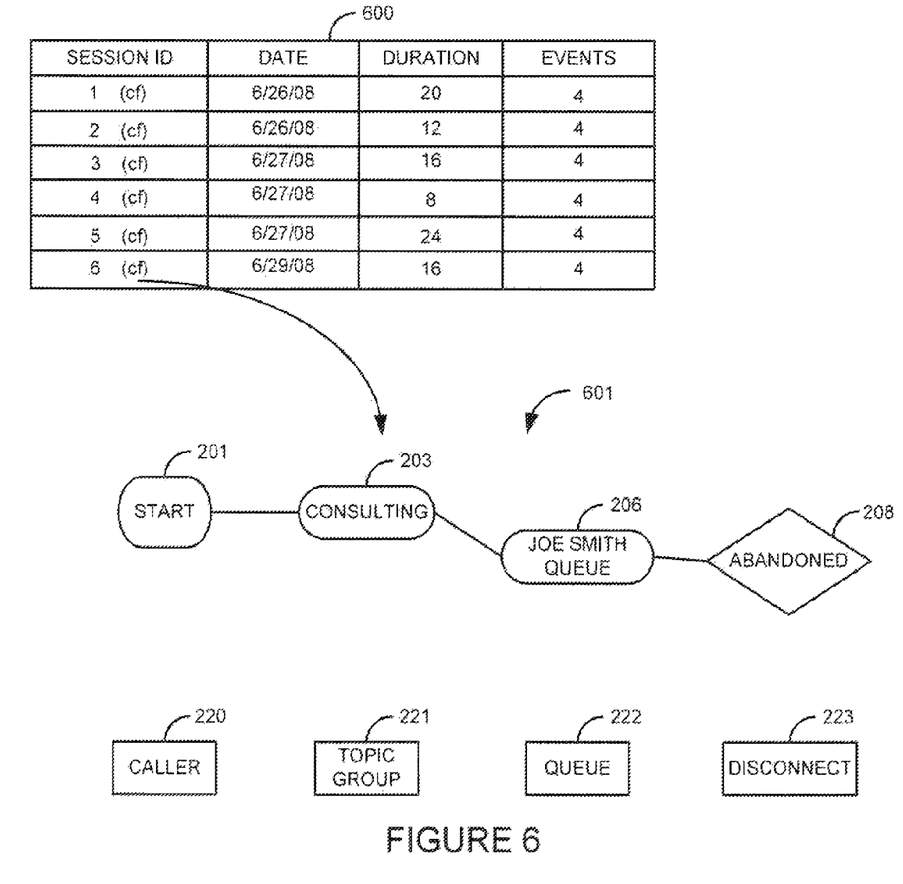
FIG. 6 is a graphical display illustrating calls associated with two call flow events and a call flow path for a specific call associated with the two call flow events.

FIG. 6 is a graphical display illustrating calls associated with two call flow events and a call flow path for a specific call associated with the two call flow events. The system 100 allows the administrator to select a specific call flow path and see all calls and/or specific calls in a particular call flow path. For example, the administrator can select a call flow path by selecting the number associated with two call flow events. In this example, the administrator selected the "6" in the call flow associated with the agent Joe Smith queue 206 and the abandoned 208 call flow events in FIG. 5.

Call table 600 is displayed to the administrator. The call table 600 shows various call statistics 104 about all of the six calls in the call flow associated with the agent Joe Smith queue 206 and the abandoned 208 call flow events. Call table 600 shows a session ID, the date of the call, the duration of the call, and how many call flow events were traversed during the call. The call statistics 104 in the call table are only a subset of many call statistics 104 that may be displayed in association with a call.

The administrator can further drill down to show the call flow for a specific call. In this example, the administrator selected the "cf" (indicating call flow) in the SESSION ID column next session ID 6. As a result, the call flow 601 for the call with the session ID of 6 is displayed to the administrator. This allows the administrator to view a call flow for a specific call. The administrator can display all the calls for any call flow path. For example, the administrator could have selected the "69" associated with the Joe Smith queue 206 and the agent Joe Smith 212 call flow events in FIG. 5. A call table like the one shown in FIG. 6 would be displayed, but in this example, there would be 69 calls shown in the table. The administrator then could look at an individual call flow in the same manner as shown in FIG. 6. Using these methods, an administrator can display calls for virtually any portion of the calls.

Figure 7:
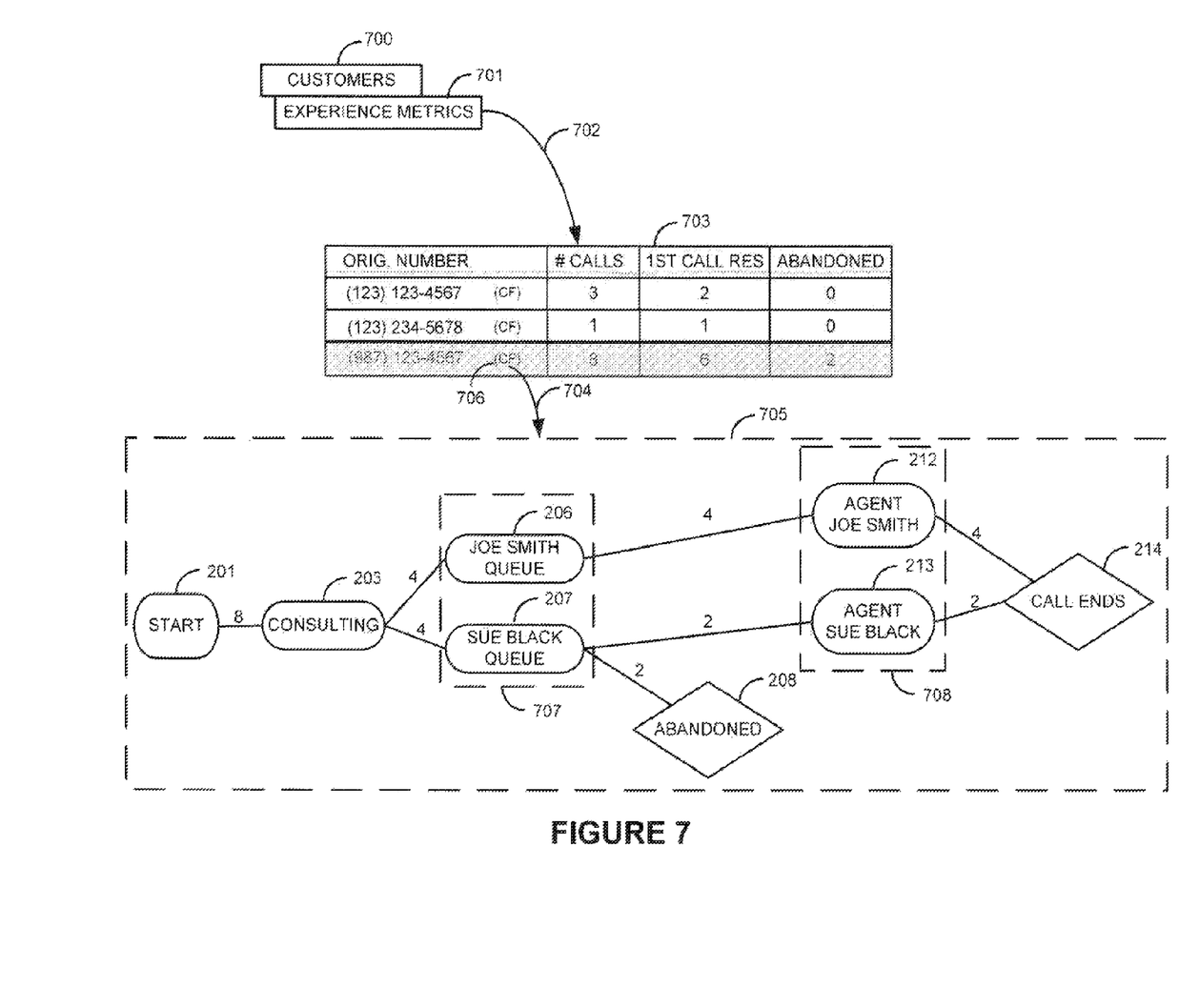
FIG. 7 is a graphical display illustrating a call flow for a specific caller.

FIG. 7 is a graphical display illustrating a call flow for a specific caller 705. The system 100 allows the administrator from a customer menu 700 to select 702 an experience metrics menu item 701. When the administrator selects 702 the experience metrics menu item 701, a table of caller statistics 703 is displayed for each origination number. The table of caller statistics 703 may contain various statistics associated with the caller such as: the origination number, the number of calls from the origination number, the number of calls that were resolved the first time (first call resolution), the number of calls which were abandoned, and the like. The above are illustrative examples of how the method could be implemented.

The administrator selects 704 a caller identifier 706 (the Call Flow (CF) icon associated with origination number (987) 123-4567). The call flow for the specific caller 705 (origination number (987) 123-4567) is displayed. In this example, all eight calls that were started 201 went to consulting 203. Four went to the Joe Smith queue 206 and four went to the Sue Black queue 207. All four calls that went to the Joe Smith queue 206 were handled by agent Joe Smith 212. Of the four calls that went to the Sue Black queue 207, two were abandoned 208 and two were handled by agent Sue Black 213. The call flow for the specific caller 705 contains two event groups 707 and 708. Event group 707 contains the Joe Smith queue 206 and the Sue Black queue 207. The event group 708 contains agent Joe Smith 212 and agent Sue Black 213. The event groups 707-708 could have associated buttons (not shown) similar to those shown in FIG. 2 (221-224).

Figure 8:
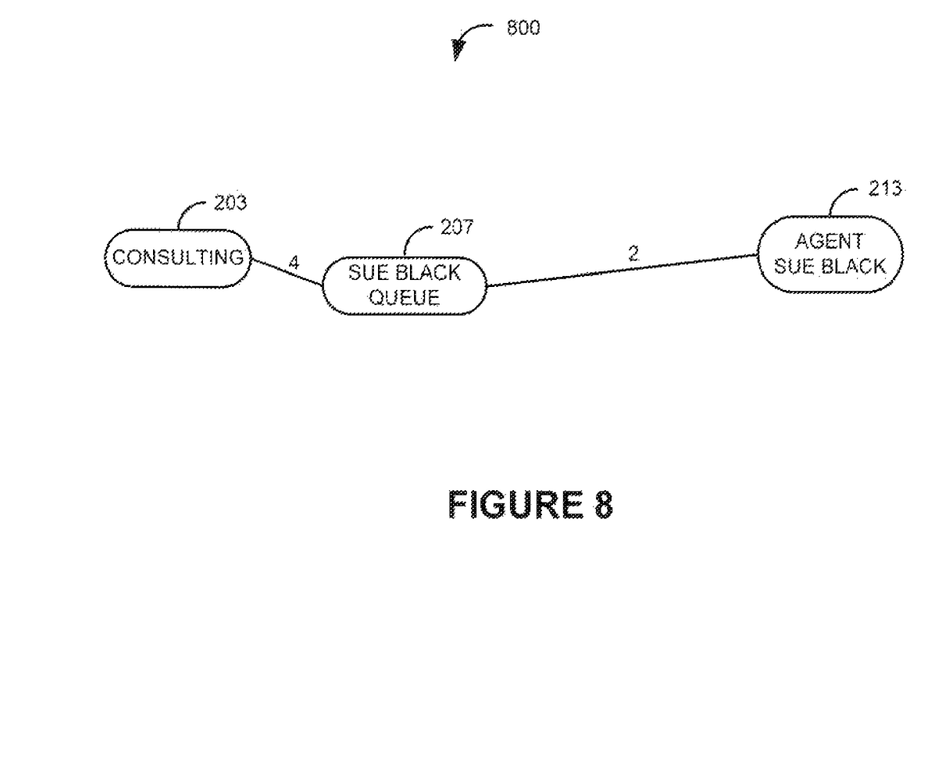
FIG. 8 is a graphical display illustrating a call flow associated with call flow events.

FIG. 8 is a graphical display illustrating a call flow 800 associated with call flow events. The administrator can also display a call flow 800 associated with two events. From call flows (e.g. 200, 400, 500, and 705), the administrator can select two events 201-214 and display a call flow associated with the events. For example in FIG. 7, if the administrator selected consulting 203 and agent Sue Black 213, the call flow 800 associated with consulting 203 and agent Sue Black 213 is shown. There are various ways an administrator can select events to display the call flow between the events. For example, the administrator could right click on two event to display the call flow 800 associated with call flow events.

Of course, various changes and modifications to the illustrative embodiment described above will be apparent to those skilled in the art. For example, modifications include, but are not limited to positioning a pointer over an event can show statistics about the event, only showing portions of a call flow when selecting an event, zooming in and out of level of details, viewing call flows over time, and the like. Other examples include, but are not limited to hosting versus on sight, using various report systems, analysis of call times, and hierarchical viewing. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system for displaying call flows and call statistics for a plurality of calls, the system comprising:
   a. a call flow analyzer configured to identify a plurality of call flow events, wherein call statistics are associated with the call flow events;
   b. wherein the call flow analyzer is configured to organize the plurality of call flow events into one or more event groups based on a similar characteristic of each call flow event of the plurality of call flow events, wherein each event group comprises at least one call flow event of the plurality of call flow events, and wherein, during a call of the plurality of calls, the at least one call flow event included in each event group other than a first event group occurs to the call subsequently to a call flow event in a preceding event group; and
   c. a server configured to receive a selection of one of the one or more event groups via a displayed button representing the selected event group, wherein the server is configured to render for display the call statistics associated with the at least one call flow event of the selected event group.

2. The system of claim 1, wherein the server is configured to respond to selection of one of the plurality of call flow events by rendering for display a first call flow associated with the one call flow event.

3. The system of claim 2, wherein the server is configured to respond to selection of a second one of the plurality of call flow events by rendering for display a second call flow associated with the second call flow event.

4. The system of claim 1, wherein the server is configured to render for display a most frequently traveled call flow.

5. The system of claim 1 further comprising at least one item selected from the group comprising: a web browser and a software application, for displaying the rendered display call statistics.

6. The system of claim 1, wherein the server is configured to respond to selection of a call flow path by rendering for display calls in the call flow path.

7. The system of claim 6, wherein the server is configured to respond to selection of an individual call by rendering for display a call flow for the individual call.

8. The system of claim 1, wherein the plurality of call flows events are at least one item selected from the group comprising: an event from an interactive voice response system, a call transfer event, placing a call in a queue, transferring a call to an agent, and a call termination event.

9. The system of claim 1, wherein the one or more event groups are organized based on at least one item selected from the group comprising: a topic group, a topic, a call queue group, a disconnect group, an agent group, a group of individual agents, an IVR response group, and a consultation group.

10. The system of claim 1, wherein the call statistics associated with the plurality of call flow events are at least one item selected from the group comprising:
   a first call resolution for a group, a first call resolution for an agent, a call completion rate for a group, a call completion rate for an agent, abandoned calls for a group, disconnected calls for a group, a comparison of agent groups, the duration of the call, and a comparison of agents.

11. The system of claim 1, wherein the server is a web server.

12. The system of claim 1, wherein the one or more call statistics are generated from at least one item selected from the group comprising: a voice call, a video call, a text message call, an email call, a chat call, and a multimedia call.

13. The system of claim 1, wherein the server is configured to respond to the selection of two of the plurality of call flow events by rendering for display call flow associated with the two selected call flow events.

14. A method for displaying call flows and call statistics for a plurality of calls, the method comprising:
   a. identifying a plurality of call flow events in a call analysis system;
   b. associating call statistics with the plurality of call flow events;
   c. organizing the plurality of call flow events into one or more event groups based on a similar characteristic of each call flow event of the plurality of call flow events, wherein each event group comprises at least one call flow event of the plurality of call flow events, and wherein, during a call of the plurality of calls, the at least one call flow event included in each event group other than a first event group occurs to the call subsequently to a call flow event in a preceding event group;
   d. receiving a selection of one of the one or more event groups via a displayed button representing the selected event group; and
   e. rendering for display the call statistics associated with the at least one call flow event of the selected event group.

15. The method of claim 14, further comprising: receiving a selection of one of the plurality of call flow events and rendering for display a first call flow associated with the one call flow event.

16. The method of claim 15, further comprising: receiving a selection of a second one of the plurality of call flow events and rendering for display a second call flow associated with the second call flow event.

17. The method of claim 14, further comprising: rendering for display a most frequently traveled call flow.

18. The method of claim 14, wherein the rendered display call statistics are displayed in at least one item selected from the group comprising: a web browser and a software application.

19. The method of claim 14, further comprising: receiving a selection of a call flow path and rendering for display calls in the selected call flow path.

20. The method of claim 19, further comprising: receiving a selection for an individual call and rendering for display a call flow for the individual call.

21. The method of claim 14, wherein the plurality of call flows events are at least one item selected from the group comprising: an event from an interactive voice response system, a call transfer event, placing a call in a queue, transferring a call to an agent, and a call termination event.

22. The method of claim 14, wherein the one or more event groups are organized based on at least one item selected from the group comprising: a topic group, a topic, a call queue group, a disconnect group, an agent group, a group of individual agents, an IVR group, and a consultation group.

23. The method of claim 14, wherein the one or more call statistics associated with the plurality of call flow events are at least one item selected from the group comprising: a first call resolution for a group, a first call resolution for an agent, a call completion rate for a group, a call completion rate for an agent, abandoned calls for a group, disconnected calls for a group, a comparison of agent groups, the duration of the call, and a comparison of agents.

24. The method of claim 14, wherein the rendering for display is accomplished by a web server.

25. The method of claim 14, wherein the one or more call statistics are generated from at least one item selected from the group comprising: a voice call, a video call, a text message call, an email call, and a chat call, and a multimedia call.

26. The method of claim 14, further comprising: selecting two of the plurality of call flow events and rendering for display a call flow associated with the two selected call flow events.

27. A system for displaying call flows and call statistics for a plurality of calls, the system comprising:
   a. a call flow analyzer configured to identify a plurality of call flow events, wherein call statistics are associated with the call flow events;
   b. wherein the call flow analyzer is configured to organize the plurality of call flow events into one or more event groups based on a similar characteristic of each call flow event of the plurality of call flow events, wherein each event group comprises at least one call flow event of the plurality of call flow events, and wherein, during a call of the plurality of calls, the at least one call flow event included in each event group other than a first event group occurs to the call subsequently to a call flow event in a preceding event group;
   c. a server configured to respond to selection of one of the plurality of call flow events by rendering for display a first call flow associated with the one call flow event; and
   d. wherein the server is configured to receive a selection of one of the one or more event groups via a displayed button representing the selected event group and to render for display the call statistics associated with the at least one call flow event of the selected event group.

28. An apparatus for displaying call flows and call statistics for a plurality of calls, the apparatus comprising:
   a. means for identifying a plurality of call flow events;
   b. means for associating call statistics with the call flow events;
   c. means for organizing the plurality of call flow events into one or more event groups based on a similar characteristic of each call flow event of the plurality of call flow events, wherein each event group comprises at least one call flow event of the plurality of call flow events, and wherein, during a call of the plurality of calls, the at least one call flow event included in each event group other than a first event group occurs to the call subsequently to a call flow event in a preceding event group;
   d. means for receiving a selection of one of the one or more event groups via a displayed button representing the selected event group; and
   e. means for rendering for display the call statistics associated with the at least one call flow event of the selected event group.

\* \* \* \* \*